UNITED STATES PATENT OFFICE.

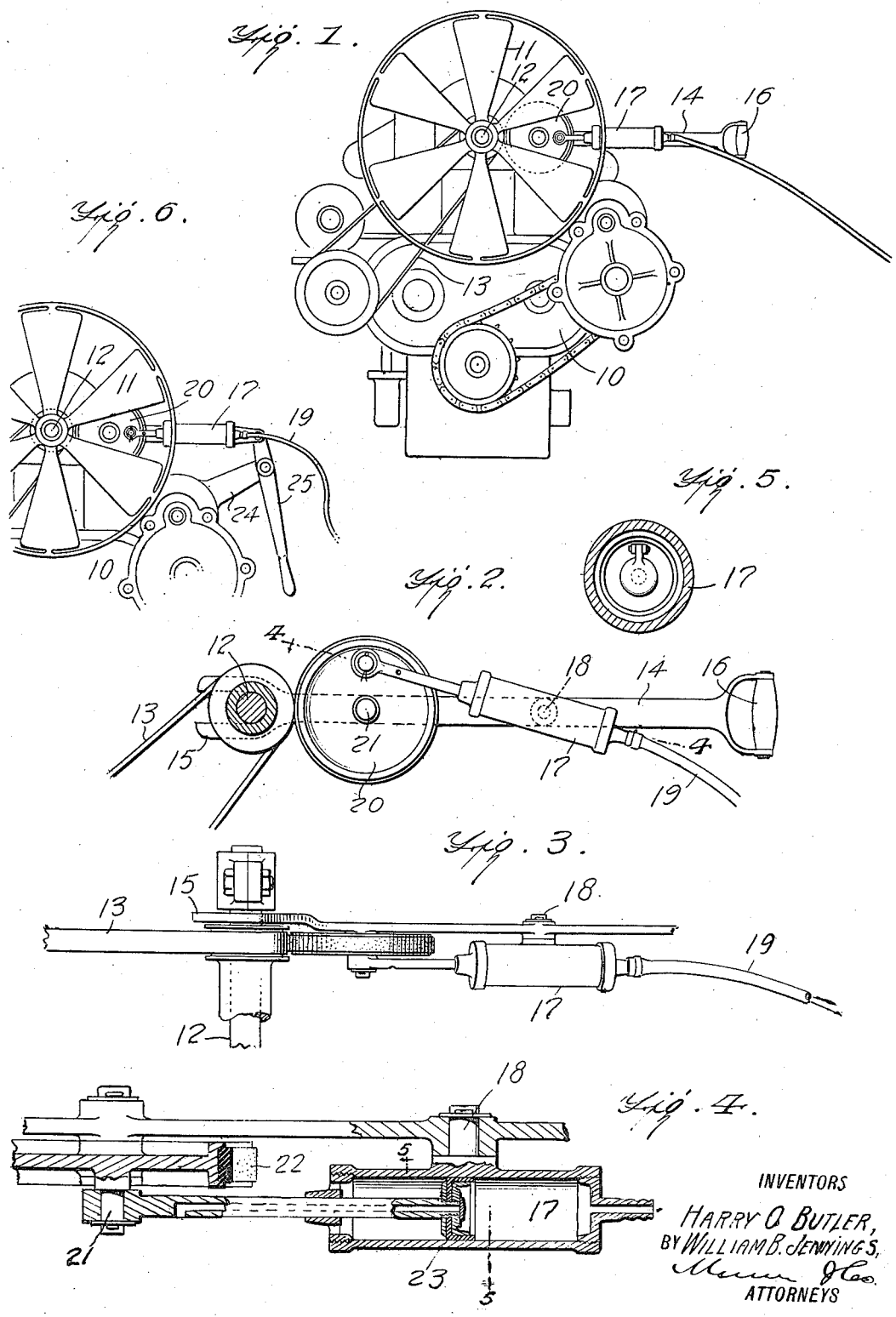

HARRY O. BUTLER AND WILLIAM B. JENNINGS, OF FRANKLIN, INDIANA.

PUMP-OPERATING MECHANISM.

1,224,849. Specification of Letters Patent. Patented May 1, 1917.

Application filed July 1, 1916. Serial No. 107,044.

*To all whom it may concern:*

Be it known that we, HARRY O. BUTLER and WILLIAM B. JENNINGS, citizens of the United States, and residents of Franklin, in the county of Johnson and State of Indiana, have invented a certain new and useful Improvement in Pump-Operating Mechanism, of which the following is a specification.

This invention is an improvement in pumps, and has particular reference to operating means therefor.

An object of the invention is to facilitate the inflation of the tires of a motor vehicle by operating an air pump by mechanism actuated through the engine of the vehicle, and including a portable pump supporting member of novel construction, carrying a rotary element driven by a movable part of said engine, to operate said pump, the latter being adapted to be connected to any of the tires of the vehicle wheel.

Another object is the provision of apparatus of this character which is simple in construction, easy to manufacture, readily mounted in position, and effective in carrying out the purpose for which it is designed.

The inventive idea involved is capable of receiving a variety of mechanical expressions, some of which, for the purpose of illustrating the invention, are shown in the accompanying drawing, wherein—

Figure 1 is an elevation of one form of the apparatus, showing the same in operative position.

Fig. 2 is an enlarged elevation similar to that shown in Fig. 1.

Fig. 3 is a top plan view.

Fig. 4 is a section on the line 4—4 of Fig. 2.

Fig. 5 is a section on the line 5—5 of Fig. 4.

Fig. 6 is a view similar to Fig. 1, showing another form of the invention.

In the drawings, the numeral 10 indicates generally an engine of any preferred type, and having associated therewith the radiator fan 11 mounted upon the shaft 12 driven by the belt 13, all of which parts are of common construction.

The mechanism which comprises the essential feature of the invention is illustrated in the drawing in what are now believed to be its preferred forms, wherein the embodiment shown in Figs. 1 to 5 includes a horizontally arranged supporting member 14 in the nature of an elongated bar having one end thereof bifurcated to provide a slot 15 for receiving the fan shaft 12, so that said supporting member will extend laterally therefrom and to the side of the engine. The outer end of the supporting member 14 is provided with a handle 16 whereby the entire apparatus may be readily conveyed about and also effectively held in operative position while a tire is being inflated.

A pump 17 of any ordinary construction is preferably mounted to oscillate upon a pivot 18 carried by the supporting member 14 adjacent the outer end thereof, and the outlet end of said pump has mounted thereon one end of a flexible connection 19, the other end of which may be secured to any of the tires of a motor vehicle. A rotary element 20 is mounted upon a stub shaft 21 carried by the supporting member 14 intermediate the pivot 18, and the inner end of said member, and carries upon its periphery a friction drive ring 22 adapted to engage the drive belt 13 operating the fan shaft 12 whereby said element 20 is rotated and the piston 23 of the air pump 17 reciprocated, which operation will oscillate the pump cylinder about its pivot 18. In the several views the rotary element 20 is shown as in operative position, and after a tire has been inflated the operator may withdraw the end 15 of the supporting member from the shaft 12, and thus break the contact between the friction ring 22 and belt 13, whereby the pump will cease to operate.

In Fig. 6 the apparatus is shown as permanently attached to the engine, and for this purpose there is provided a bracket or arm 24 carried by the engine and having a lever 25 pivoted thereto, one end of said lever being pivoted to the outer end of said member 14. Thus, by operating the lever 25, the friction ring 22 may be adjusted into and out of engagement with the belt 13.

What is claimed is:

1. A portable tire inflating mechanism, comprising a bar having an open slot at one end to be slipped over a shaft and extended alongside a drive member, a pump mounted upon the bar, and a rotary pump actuator mounted upon the bar between the slotted end thereof and the pump and adapted to be brought into engagement with the said drive member by pressure exerted longitudinally on the said bar.

2. A portable tire inflating mechanism comprising a bar having an end portion laterally offset and provided with a longitudinally extending open slot, and having its opposite end provided with the handle, a pump pivotally mounted upon a side of the bar intermediate the ends thereof, and a rotary pump actuator mounted upon the same side of the bar as the pump and between the pump and slotted end of the bars and adapted to be brought into engagement with the said drive member by pressure exerted longitudinally on the said bar.

HARRY O. BUTLER.
WILLIAM B. JENNINGS.